No. 760,160. PATENTED MAY 17, 1904.
C. SMITH & T. STAFFORD.
POWER TRANSMITTING DEVICE.
APPLICATION FILED DEC. 26, 1903.
NO MODEL. 2 SHEETS—SHEET 2.
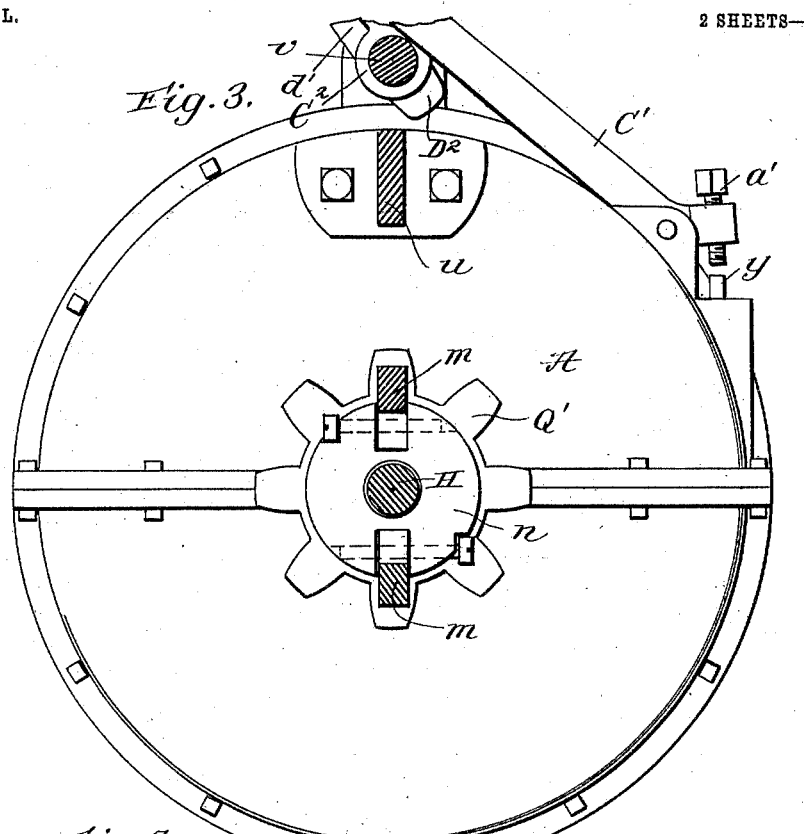
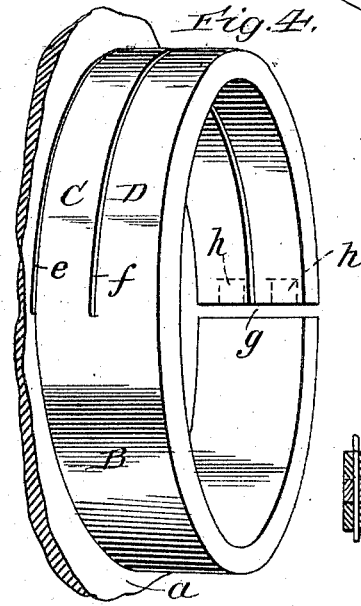
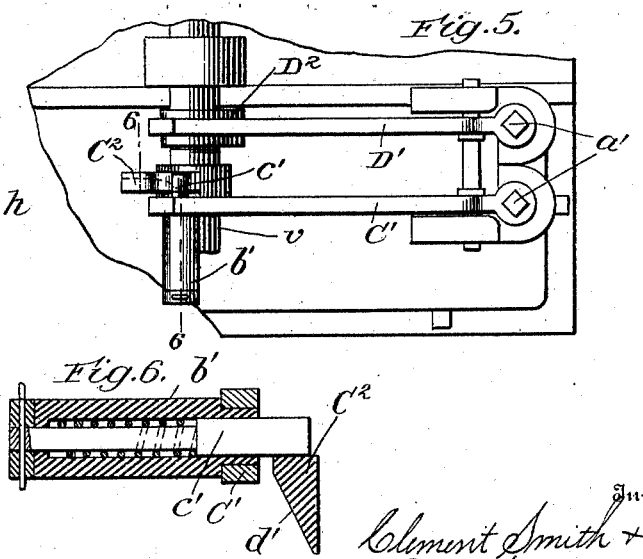
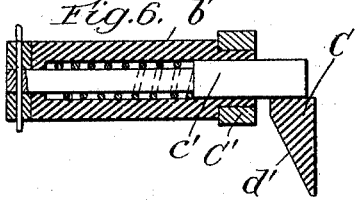

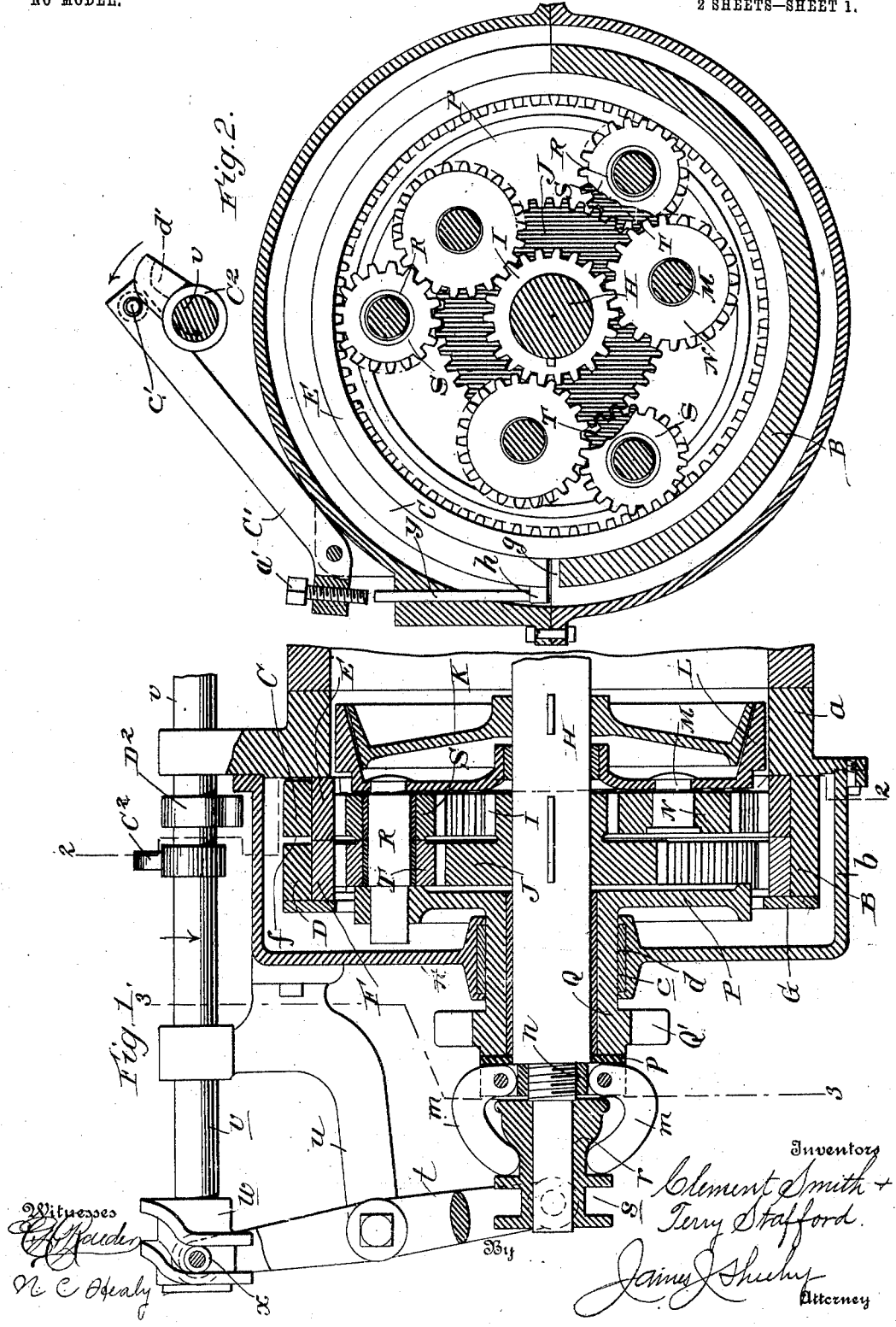

No. 760,160.                                    Patented May 17, 1904.

UNITED STATES PATENT OFFICE.

CLEMENT SMITH AND TERRY STAFFORD, OF TOPEKA, KANSAS.

POWER-TRANSMITTING DEVICE.

SPECIFICATION forming part of Letters Patent No. 760,160, dated May 17, 1904.

Application filed December 26, 1903. Serial No. 186,681. (No model.)

*To all whom it may concern:*

Be it known that we, CLEMENT SMITH and TERRY STAFFORD, citizens of the United States, residing at Topeka, in the county of Shawnee and State of Kansas, have invented new and useful Improvements in Power-Transmitting Devices, of which the following is a specification.

Our invention pertains to power-transmitting devices such as are designed more particularly for use in automobiles; and it has for its object to provide a simple and inexpensive transmitting device adapted to be easily understood and operated and embodying no delicate parts such as are likely to get out of order after a short period of use and one having an outboard-bearing supporting the sprocket adjacent to where the power is applied and in which the gears are always in mesh, are entirely inclosed, and arranged to run in lubricant, with the result that noise is practically eliminated and dust and grit are prevented from gaining access to them, and are idle, and consequently not subjected to wear during high speed.

The invention will be fully understood from the following description and claims, when taken in connection with the accompanying drawings, forming part of this specification, in which—

Figure 1 is a view, partly in elevation and partly in vertical section, of the transmitting device constituting the preferred embodiment of our invention; Fig. 2, a section taken on the line 2 2 of Fig. 1; Fig. 3, a section taken on the line 3 3 of Fig. 1; Fig. 4, a detail perspective view illustrating the brake-shoes embraced in the device; Fig. 5, a detail plan view of the means for applying the brake-shoes, and Fig. 6 an enlarged detail section taken in the plane indicated by the line 6 6 of Fig. 5.

Similar letters designate corresponding parts in all of the several views of the drawings, referring to which—

A is the casing of our novel transmitting device. This casing in the present and preferred embodiment of our invention comprises an inner portion $a$, designed to be bolted or otherwise fixed to the side of an engine, and an outer portion $b$, connected, preferably in a detachable manner, to the inner portion and having a central opening $c$, surrounded by Babbitt metal $d$. Carried by the inner portion of and contained in the casing is an annulus B. (Best shown in Fig. 4.) Said annulus, which is preferably formed integral with the inner casing portion, is cut half-way around in two places, as indicated by $e$ and $f$, and transversely, as indicated by $g$, to form two resilient brake-shoes C D. These brake-shoes are provided on their outer sides adjacent to their free ends with lugs $h$, and each is adapted to be moved independently of the other in the manner and for the purpose hereinafter set forth.

E F are internal gear-rings loosely arranged in the annulus B in vertical alinement with the shoes C D, respectively; G, an annular plate connected to the edge of the lower portion of the annulus B and having for its purpose to hold the gear-rings E and F against lateral play and displacement; H, an engine-shaft extending through the center of the casing A; I J, gears keyed or otherwise fixed on said shaft; K, the male member of a friction-clutch also fixed on the shaft; L, the female member of the clutch, which is loose on the shaft and is adapted to be moved laterally into and out of engagement with the member K; M M, studs or short shafts carried by the clutch member L and extending laterally outward therefrom; N N, gears arranged on said studs or shafts and intermeshed with the gear I, Fig. 2; P, a frame movable in the casing A toward and from the clutch member L and having a sleeve Q surrounding the engine-shaft and journaled in the opening $c$ of the casing; R R, studs or shafts carried by the frame P and projecting laterally inward therefrom and having reduced ends connected to the clutch member L, Fig. 1; S S, gears loosely mounted on said studs or shafts and interposed between and intermeshed with the gears N and the gear-ring C, and T T gears loosely mounted on the studs R and disposed between and intermeshed with the gear J and the gear-ring F.

In virtue of the construction thus far described it will be observed that when the engine-shaft is running and the brake-shoe C is pressed inwardly, so as to bear against and arrest rotation of the gear-ring E, the gears S, intermeshed with said ring, will be caused to travel in the reverse direction with reference to the direction of movement of the shaft H and at a lower rate of speed and will carry with them the studs R and the frame P, so as to reverse or back up an automobile, the sleeve Q of said frame being provided with a sprocket Q', as shown, or other suitable gear designed to form part of a driving connection between the transmitting device and the drive-axle of the automobile. It will also be observed that when pressure is removed from the shoe C and applied to the shoe D the rotation of the gear-ring F will be arrested, and in consequence the frame P and the gear Q' will be caused to travel at a slow speed in the same direction as the engine-shaft, this being desirable to start an automobile and also for hill-climbing purposes. It will be further noticed that when the frame P is moved inwardly, by means presently described, to engage the clutch member L with the member K the clutch, the gear-rings E and F, and the frame P will turn freely within the annulus B, and the gear Q' will be rotated at the same speed as the engine-shaft, this to propel the automobile forward at full speed.

The several gears within the casing A are in mesh at all times, and from this it follows that they are not subjected to shock or strain incident to the changes of speed or direction of movement; also, that the changes of speed or direction of movement are not attended by noise. The gears are entirely inclosed by the casing A, which is advantageous because it permits of the gears being profusely lubricated or made to run in lubricant and at the same time assures the exclusion of dust and grit. In addition to entirely inclosing the gears and holding lubricant it will be noticed that the casing A supports the sleeve Q and the engine-shaft at the point where the bearing is most needed—i. e., adjacent to the sprocket wheel or gear Q'.

It will be apparent that without involving departure from the scope of our invention various ratios of speed for the gear Q' may be afforded by using one or more trains of gears of differing numbers of teeth, but having the same distance between the centers of the shafts R and H and gear-rings E and F and brake-shoes C and D of the proper diameters.

In order to enable the operator of an automobile to readily effect the described changes in direction of movement and speed, we provide the mechanism best shown in Figs. 1 and 3. This mechanism comprises push-levers $m$, fulcrumed in bearings $n$, fixed on the shaft H and arranged to bear against a washer $p$, interposed between them and the outer end of the sleeve Q; a wedge $r$, movable endwise on the engine-shaft between the outer ends of said levers and having a circumferential groove $s$; a lever $t$, fulcrumed at an intermediate point of its length on a bracket $u$, fixed to the outer portion of the casing and having a yoke at its lower end engaging the grooved portion of the wedge $r$; a shaft $v$, journaled in the bracket $u$ and in a boss on the inner portion of the casing and having a grooved cam $w$ receiving an antifriction-roller $x$ on the upper arm of the lever $t$; plungers $y$, arranged in bores in the outer portion of the casing and engaging the lugs $h$ on the brake-shoes C D; levers C' D', fulcrumed on the said casing portion and provided with screws $a'$, arranged to engage the plungers $y$, and cams $C^2$ $D^2$, fixed on the shaft $v$. As best shown in Figs. 5 and 6, the lever C' is provided with a hollow lateral projection $b'$, containing a spring-backed pin $c'$, which extends laterally inward from the lever. The cam $C^2$, which is complementary to the lever C', is preferably shaped and relatively arranged as shown and is beveled at one side, as indicated by $d'$. The cam $D^2$ is a plain cam immediately underneath the lever D' and operates when the motion of the shaft $v$ is reversed. The shaft $v$ is designed to be rotated by an automobile operator through the medium of means which forms no part of our invention and is therefore not illustrated. When the said shaft is turned in the direction indicated by arrow in Figs. 1 and 2, the cam $C^2$, bearing upon the pin $c'$, raises the lever C', causing the plunger $y$ to descend and press the brake-shoe D against the ring F, thereby setting in motion the slow speed. Further motion of shaft $v$ causes cam $C^2$ to release, thus freeing the low speed preparatory to engaging the high speed through the action of the grooved cam $w$, causing the lever $t$ to move the wedge $r$ outwardly, which operates the push-levers $m$ $m$, forcing the casing Q, shafts M M M, and female member of clutch L in the opposite direction into engagement with the member K of clutch, thus obtaining the high speed. Movement of the shaft $v$ in a reverse direction will not engage the slow speed, owing to the pin $c'$ striking the beveled rear side of cam $C^2$ and springing out of the way, snapping back into position for use again as soon as the cam has passed it. Further movement in a reverse direction causes the cam $D^2$ to lift the lever D', causing the plunger $y$ under said lever to descend and press the brake-shoe C against the internal gear-ring E, thereby setting in motion the reverse motion or back-up. From this it will be appreciated that an automobile operator is enabled to quickly and easily set the reverse-gear in motion and as quickly and easily change the gear to slow speed forward and then to full speed forward.

We have entered into a detailed description of the construction and relative arrangement of the parts embraced in the present and preferred embodiment of our invention in order to impart a full, clear, and exact understanding of the same. We do not desire, however, to be understood as confining ourselves to such specific construction and relative arrangement of parts, as such changes or modifications may be made in practice as fairly fall within the scope of our invention as claimed.

Having described our invention, what we claim, and desire to secure by Letters Patent, is—

1. In a power-transmitting device, the combination of a shaft, internal gear-rings surrounding the same, a clutch member fixed on the shaft, a clutch member loosely mounted on the shaft, a frame to be driven, loosely mounted on the shaft, connected with the second-mentioned clutch member and movable toward and from the first-mentioned clutch member, gears fixed on the shaft, gears carried by the frame to be driven, and intermeshed with the internal gear-rings; one of said gears being also intermeshed with one of the gears on the shaft, a gear carried by the second-mentioned clutch member, and interposed between the other gear of the frame and the other gear on the shaft, means for moving the frame laterally, and means for arresting rotation of the internal gear-rings.

2. In a power-transmitting device, the combination of a shaft, internal gear-rings surrounding the same, a clutch member fixed on the shaft, a clutch member loosely mounted on the shaft, a frame to be driven, loosely mounted on the shaft, connected with the second-mentioned clutch member and movable toward and from the first-mentioned clutch member, gears fixed on the shaft, sets of gears carried by the frame to be driven, and intermeshed with the internal gear-rings; one of said sets of gears being also intermeshed with one of the gears on the shaft, a gear carried by the second-mentioned clutch member, and interposed between the other gear of the frame and the other gear on the shaft, independently-movable brake-shoes normally resting out of engagement with the gear-rings, means for pressing said shoes into engagement with the gear-rings to arrest rotation of the latter, and means for moving the gear-carrying frame laterally.

3. In a power-transmitting device, the combination of a fixed annulus having independently-movable, resilient brake-shoes, a shaft extending through said annulus, internal gear-rings loosely arranged in the annulus in position to be engaged by the brake-shoes, means for pressing the brake-shoes inwardly, a clutch member fixed on the shaft, a clutch member loosely mounted on the shaft, a frame to be driven, loosely mounted on the shaft, connected with the second-mentioned clutch member and movable toward and from the first-mentioned clutch member, gears fixed on the shaft, gears carried by the frame to be driven, and intermeshed with the internal gear-rings; one of said gears being also intermeshed with one of the gears on the shaft, a gear carried by the second-mentioned clutch member, and interposed between the other gear of the frame and the other gear on the shaft, and means for moving the gear-carrying frame laterally.

4. In a power-transmitting device, the combination of a casing, an annulus fixed in said casing, and having independently-movable, resilient brake-shoes, a shaft extending through the casing, internal gear-rings loosely arranged in the annulus in position to be engaged by the brake-shoes, means for pressing the brake-shoes inwardly, a clutch member fixed on the shaft, a clutch member loosely mounted on the shaft, a frame to be driven, having a sleeve loosely mounted on the shaft and journaled in the casing; said frame being connected with the second-mentioned clutch member and movable toward and from the first-mentioned clutch member, gears fixed on the shaft, gears carried by the frame to be driven, and intermeshed with the internal gear-rings; one of said gears being also intermeshed with one of the gears on the shaft, a gear carried by the second-mentioned clutch member, and interposed between the other gear of the frame and the other gear on the shaft, and means for moving the gear-carrying frame laterally.

5. In a power-transmitting device, the combination of a casing comprising an inner section, an outer section connected to the inner section, and an interior annulus formed integral with the inner section, and having independently-movable, resilient brake-shoes, means for pressing said shoes inwardly, a shaft extending through the casing, internal gear-rings loosely arranged in the annulus in position to be engaged by the brake-shoes, a clutch member fixed on the shaft, a clutch member loosely mounted on the shaft, a frame to be driven having a sleeve loosely mounted on the shaft, and journaled in the outer section of the casing; said frame being connected with the second-mentioned clutch member and movable toward and from the first-mentioned clutch member, gears fixed on the shaft, gears carried by the frame to be driven, and intermeshed with the internal gear-rings; one of said gears being also intermeshed with one of the gears on the shaft, a gear carried by the second-mentioned clutch member, and interposed between the other gear of the frame and the other gear on the shaft, and means for moving the gear-carrying frame laterally.

6. In a power-transmitting device, the combination of a casing having bores, plungers movable in said bores, a fixed annulus arranged in the casing, and having independently-movable resilient brake-shoes provided with lugs arranged to be engaged by the plungers, means for moving said plungers, a shaft extending through the casing, internal gear-rings loosely arranged in the annulus in position to be engaged by the brake-shoes, a clutch member fixed on the shaft, a clutch member loosely mounted on the shaft, a frame to be driven having a sleeve loosely mounted on the shaft, and journaled in the outer section of the casing; said frame being connected with the second-mentioned clutch member and movable toward and from the first-mentioned clutch member, gears fixed on the shaft, gears carried by the frame to be driven, and intermeshed with the internal gear-rings; one of said gears being also intermeshed with one of the gears on the shaft, a gear carried by the second-mentioned clutch member, and interposed between the other gear of the frame and the other gear on the shaft, and means for moving the gear-carrying frame laterally.

7. In a power-transmitting device, the combination of a casing having bores, plungers movable in said bores, a fixed annulus arranged in the casing, and having independently-movable, resilient brake-shoes provided with lugs arranged to be engaged by the plungers, a shaft extending through the casing, internal gear-rings loosely arranged in the annulus in position to be engaged by the brake-shoes, a clutch member fixed on the shaft, a clutch member loosely mounted on the shaft, a frame to be driven having a sleeve loosely mounted on the shaft, and journaled in the outer section of the casing; said frame being connected with the second-mentioned clutch member and movable toward and from the first-mentioned clutch member, gears fixed on the shaft, gears carried by the frame to be driven, and intermeshed with the internal gear-rings; one of said gears being also intermeshed with one of the gears on the shaft, a gear carried by the second-mentioned clutch member and interposed between the other gear of the frame and the other gear on the shaft, levers carried by the shaft, and arranged to engage and move the sleeve of the gear-carrying frame, a wedge movable between said levers, a shaft, a cam on said shaft, a lever having one arm engaging the wedge and its other arm in engagement with the cam, a second cam on said shaft arranged to depress one of the plungers when the said shaft is turned in one direction, and a third cam on the said shaft arranged to depress the other plunger when the shaft is turned in the opposite direction.

8. In a power-transmitting device the combination of a shaft, an internal gear-ring surrounding the same, a clutch member fixed on the shaft, a gear also fixed on the shaft, a clutch member loosely mounted on the shaft, a frame to be driven loosely mounted on the shaft, connected with the loose clutch member and movable toward and from the first-mentioned clutch member, a gear carried by the said frame and intermeshed with the internal gear-ring and also with the gear on the shaft, means for moving the frame laterally and means for arresting rotation of the internal gear.

9. In a power-transmitting device, the combination of a shaft, an internal gear-ring surrounding the same, a clutch member fixed on the shaft, a gear also fixed on the shaft, a clutch member loosely mounted on the shaft, a gear carried by the movable clutch member and intermeshed with the gear on the shaft, a frame to be driven loosely mounted on the shaft, connected with the loose clutch member and movable toward and from the first-mentioned clutch member, a gear carried by the said frame and intermeshed with the gear on the movable clutch member and also with the internal gear-ring, means for moving the frame laterally, and means for arresting rotation of the internal gear.

10. The combination in a power-transmitting device, of a shaft, a gear to be driven, gears intermediate of the shaft and the gear to be driven, gear-rings surrounding and engaging said gears, brake-shoes normally resting out of engagement with said gear-rings, a rotary shaft, a cam on said shaft, means for depressing one brake-shoe, arranged to be engaged by said cam when the shaft is turned in one direction, a second cam on the shaft, and means for depressing the other brake-shoe, arranged to be engaged by the latter cam when the shaft is turned in the opposite direction.

11. The combination in a power-transmitting device, of a shaft, a gear to be driven, gears intermediate of the shaft and the gear to be driven, a gear-ring surrounding and engaging said gears, a brake-shoe normally resting out of engagement with the perimeter of the gear-ring, a plunger arranged to press the brake-shoe against the gear-ring, a lever arranged to engage the plunger, and a rotary cam arranged to engage the lever.

12. The combination in a power-transmitting device, of a shaft, a gear to be driven, gears intermediate of the shaft and the gear to be driven, gear-rings surrounding and engaging said gears, brake-shoes normally resting out of engagement with the perimeters of said gear-rings, plungers arranged to press the shoes against the rings, levers engaging the plungers, a rotary shaft, a cam on said shaft arranged to operate one lever when the shaft is turned in one direction, and a second cam on the shaft, arranged to operate the other lever when the shaft is turned in the opposite direction.

13. The combination in a power-transmitting device, of a shaft, a gear to be driven, gears intermediate of the shaft and the gear to be driven, gear-rings engaging the gears, brake-shoes arranged to engage the gear-rings, plungers arranged to engage the brake-shoes, a rotary shaft, levers arranged to engage the plungers, a cam on the said shaft arranged when the shaft is turned in one direction, to operate one lever, a cam on the shaft arranged when the shaft is turned in the opposite direction, to operate the other shaft, and means operated by said shaft for fixing the gear to be driven, the intermediate gears and the gear-rings with respect to the first-mentioned shaft.

14. The combination in a power-transmitting device, of brake-shoes, levers for moving the same; one of said levers having a lateral, spring-backed pin, a rotary shaft arranged to be turned in opposite directions, a cam on said shaft arranged to engage the pin on one lever, when the shaft is turned in one direction, and having a beveled rear side whereby it is enabled to ride past the pin when the shaft is turned in the opposite direction, and a second cam on the shaft arranged to engage the other lever when the shaft is turned in the latter direction.

In testimony whereof we have hereunto set our hands in presence of two subscribing witnesses.

CLEMENT SMITH.
TERRY STAFFORD.

Witnesses:
   Geo. E. Stokes,
   A. W. Greenwood.